(No Model.)
W. H. GILMAN.
AERIAL VELOCIPEDE AND TRACK.
No. 550,878. Patented Dec. 3, 1895.
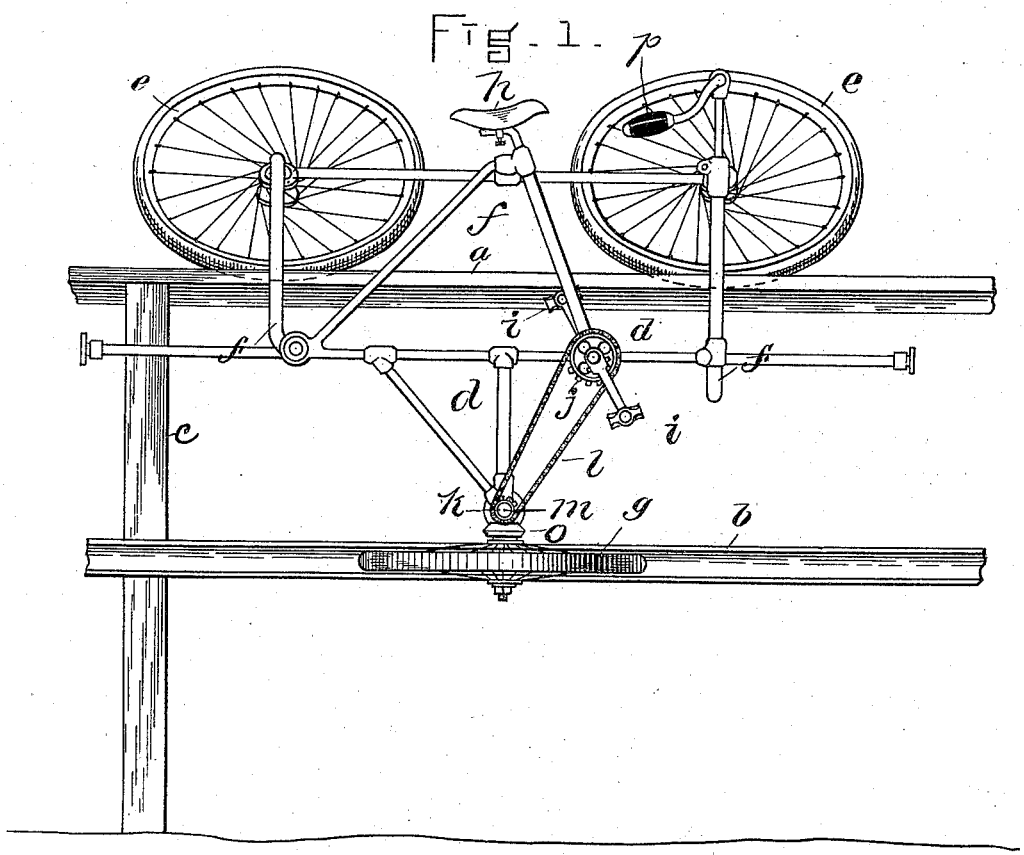
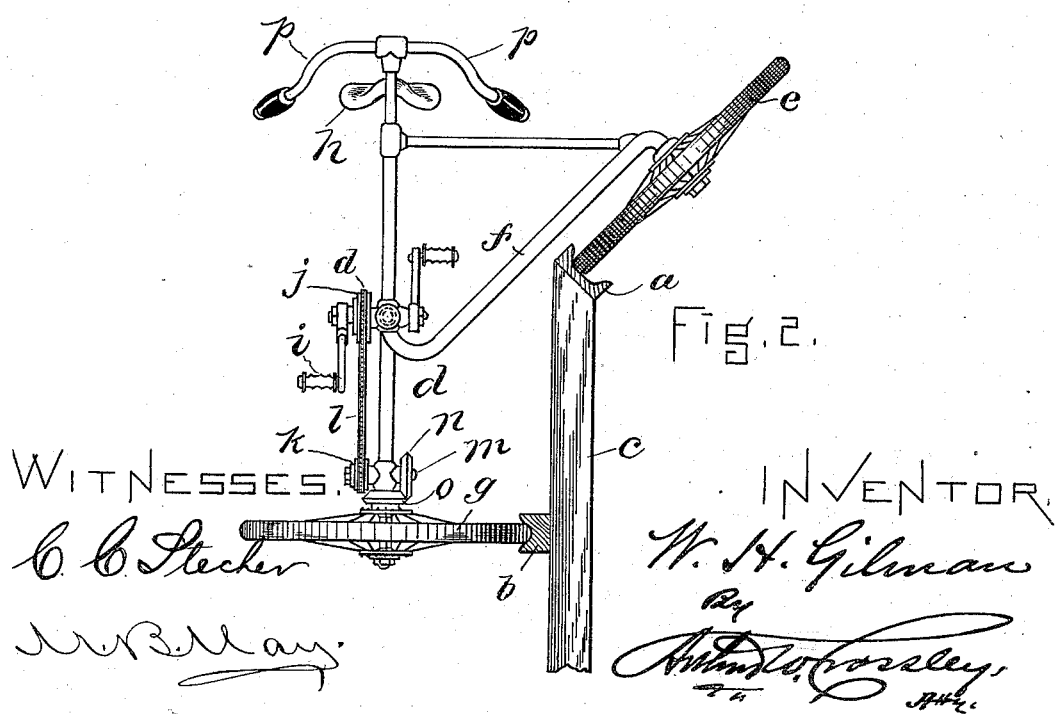
WITNESSES.
C. C. Stecher
N. B. May
INVENTOR.
W. H. Gilman
By
Arthur O. Crossley
Atty.

UNITED STATES PATENT OFFICE.

WILLARD H. GILMAN, OF BOSTON, MASSACHUSETTS, ASSIGNOR, BY DIRECT AND MESNE ASSIGNMENTS, TO ARTHUR W. CROSSLEY, OF SAME PLACE, AND JOHN J. McCORMACK, OF BROOKLINE, MASSACHUSETTS.

AERIAL VELOCIPEDE AND TRACK.

SPECIFICATION forming part of Letters Patent No. 550,878, dated December 3, 1895.

Application filed October 23, 1895. Serial No. 566,646. (No model.) Patented in Canada November 8, 1895, No. 50,521.

*To all whom it may concern:*

Be it known that I, WILLARD H. GILMAN, of Boston, in the county of Suffolk and State of Massachusetts, have invented certain new and useful Improvements in Aerial or Elevated Velocipedes and Tracks, (patented in Canada November 8, 1895, No. 50,521) of which the following is a specification.

This invention has relation to that class or kind of bicyles or velocipedes which are constructed and arranged to run on an elevated track and are sometimes called "aerial bicycles."

It is the object of the invention to provide such improvements in aerial or elevated bicycles or velocipedes as will dispense with all overhead framework and trussing, obviate all swaying or swinging of the carriage, simplify the construction, and gain other advantages and overcome other objections, as will appear obvious from the disclosure of the invention herein given.

To the foregoing ends the invention consists of an aerial or elevated velocipede embodying in its construction a suitable carriage consisting of open framework, an upper wheel or wheels adapted to run on an elevated track or rail, a framing of suitable character connecting the upper wheel or wheels or the axles thereof with the carriage, a seat in the carriage, a lower horizontally-arranged traction or driving wheel adapted to run on a vertically-arranged track or rail, pedals in the carriage within reach of and adapted to be operated by the feet of the occupant of the seat, means, as hereinafter set forth, operatively connecting the pedals with the driving-wheel to impart motion to it and so drive the velocipede along at the side of the track, and steadying-handles connected with the carriage-frame and also within reach of the occupant of the seat, all as I will now proceed to describe more in detail, and then point out in the appended claim.

Reference is to be had to the annexed drawings, and to the letters marked thereon, forming a part of this specification, the same letters designating the same parts or features, as the case may be, wherever they occur.

Of the drawings, Figure 1 is a side elevation of my improved elevated bicycle or velocipede and track. Fig. 2 is an end view of the same, the rails being shown as in section.

Of the drawings, $a$ designates the upper rail or track, and $b$ the lower or side rail. The said rails are supported on a suitable framework or truss $c$ at any desired elevation above the ground.

$d$ designates the carriage, which may be composed of a suitable framework in general structural character similar to that of the framework of a common bicycle.

$e\ e$ are wheels adapted to run on the upper track $a$, the axles of which wheels are connected through the medium of suitable framing $f$ with the carriage $d$.

$g$ designates a horizontally-arranged driving-wheel suitably supported in the lower part of the carriage $d$ and arranged to run on the lower vertically-arranged track $b$.

The carriage is provided with a seat $h$, which may be made adjustable as to height and from which the occupant may by means of the feet operate the pedals $i\ i$ and communicate motion to the horizontally-disposed driving-wheel $g$ through the medium of the sprocket-wheels $j$ and $k$, connecting sprocket-chain $l$, shaft $m$, bevel-wheel $n$ thereon, and bevel-wheel $o$, compounded or connected with the driving-wheel $g$. I have contemplated different forms of means for communicating motion to the driving-wheel from the pedals; but the foregoing will be sufficient to convey to those skilled in the art a clear understanding of this part of the invention.

The upper track or rail $a$ is secured on the top of the trestle or support $c$ in an inclined position—say at an angle of forty-five degrees, as shown—and the wheels $e$, adapted to run on the said rail, are arranged at substantially the same degree of inclination, while the connecting framework $f$ extends outward and downward in an inclined direction to the carriage, which is arranged to run at the side of the framework or trestle $c$ and the rails $a\ b$, which latter instrumentalities are grooved, so as to make sure that the wheels do not leave the rails in the operation of the device.

Handle-bars $p$ may be provided at a convenient point forward of the seat in the carriage to steady the occupant on the said seat and enable him the better to actuate the pedals in the propulsion of the bicycle.

I have proposed to connect two carriages and arrange one on each side of the trestle-work c, in which case one carriage would counterbalance the other and a single wheel or set of wheels e, common to both carriages, would be vertically arranged; but the construction shown will be sufficient to make clear the nature and spirit of the invention.

By my improvements I overcome all swaying or lateral swinging motion of the carriage, a difficulty experienced with elevated bicycles hung from an overhead track. Again, I dispense with all overhead framework and rails. Moreover, I am enabled to make the supporting trestle or frame much lower than where the rails are above the carriage. The rail a being inclined and the rail b being arranged in vertical position, no obstruction can become lodged thereon to interfere with the running of the wheels or menace the safety of the occupant of the carriage.

The construction and arrangement are such as to distribute the friction between the supporting-wheels e and driving-wheel g and so make the contrivance easy of operation along its track.

The wheels e and g may be of the structural character shown or of any other suited to the purpose, and the angle of inclination of the wheels e, track or rail a, and connecting-framework f may be varied to suit circumstances.

I have contemplated the provision of the carriage with two horizontally-arranged wheels g and a single supporting-wheel e; but the arrangement shown in the drawings will serve well the purposes of the invention, the most important features of which are the arrangement of the carriage at the side of the track with the supporting wheel or wheels running on an upper rail and the driving wheel or wheels horizontally disposed below the seat of the carriage and adapted to run on a vertically-arranged track.

Having thus explained the nature of the invention and described a way of constructing and using the same, though without attempting to set forth all of the forms in which it may be made or all of the modes of its use, it is declared that what is claimed is—

An aerial or elevated velocipede comprising in its construction, a carriage consisting of open frame-work provided with a seat, supporting wheels disposed at one side of the carriage and adapted to run on an upper rail, open frame-work connecting the said supporting wheels with the carriage, a horizontally arranged driving wheel supported in the carriage frame and disposed below the seat and adapted to run on a lower vertical rail, operative pedals in the frame within reach of the feet of the occupant of the seat, mechanism substantially as set forth operatively connecting the pedals with the driving wheel for communicating motion thereto and steadying handles connected with the carriage frame and within reach of the occupant of the seat.

In testimony whereof I have signed my name to this specification, in the presence of two subscribing witnesses, this 21st day of October, A. D. 1895.

WILLARD H. GILMAN.

Witnesses:
ARTHUR W. CROSSLEY,
C. C. STECHER.